US010204644B1

(12) United States Patent
Benakli et al.

(10) Patent No.: US 10,204,644 B1
(45) Date of Patent: Feb. 12, 2019

(54) MAGNETIC WRITE TRANSDUCER WITH FLAT POLE SECTION

(71) Applicant: Seagate Technology LLC, Cupertino, CA (US)

(72) Inventors: Mourad Benakli, Eden Prairie, MN (US); Kirill Aleksandrovich Rivkin, Edina, MN (US); Huaqing Yin, Eden Prairie, MN (US); Hua Zhou, Plymouth, MN (US); Tae-Woo Lee, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/601,032

(22) Filed: May 22, 2017

Related U.S. Application Data

(60) Provisional application No. 62/340,365, filed on May 23, 2016.

(51) Int. Cl.
| | | |
|---|---|---|
| *G11B 5/127* | (2006.01) | |
| *G11B 5/31* | (2006.01) | |
| *G11B 5/187* | (2006.01) | |
| *G11B 5/39* | (2006.01) | |

(52) U.S. Cl.
CPC .......... *G11B 5/1278* (2013.01); *G11B 5/1871* (2013.01); *G11B 5/314* (2013.01); *G11B 5/315* (2013.01); *G11B 5/3116* (2013.01); *G11B 5/3133* (2013.01); *G11B 5/3146* (2013.01); *G11B 5/3163* (2013.01); *G11B 5/3967* (2013.01)

(58) Field of Classification Search
CPC ..... G11B 5/1278; G11B 5/3133; G11B 5/314; G11B 5/315
USPC ............... 360/123.02, 123.11, 125.3, 125.31
See application file for complete search history.

(56) References Cited

U.S. PATENT DOCUMENTS

| | | | |
|---|---|---|---|
| 8,264,792 B2 | 9/2012 | Bai et al. | |
| 9,019,659 B1 | 4/2015 | Yin et al. | |
| 9,099,112 B1* | 8/2015 | Balamane | G11B 5/314 |
| 9,818,440 B1* | 11/2017 | Jubert | G11B 5/62 |
| 2011/0222188 A1 | 9/2011 | Etoh et al. | |
| 2011/0273800 A1 | 11/2011 | Takano et al. | |
| 2013/0186854 A1* | 7/2013 | Araki | G11B 5/31 216/24 |
| 2013/0283601 A1* | 10/2013 | Sasaki | G11B 5/1278 29/603.07 |
| 2014/0050058 A1* | 2/2014 | Zou | G11B 11/10534 369/13.33 |
| 2014/0063648 A1 | 3/2014 | Shiroishi et al. | |

(Continued)

*Primary Examiner* — Jefferson Evans
(74) *Attorney, Agent, or Firm* — Hollingsworth Davis, LLC

(57) ABSTRACT

A recording head includes a magnetic write transducer proximate a near-field transducer. The magnetic write transduce includes a yoke extending in a direction normal to a media-facing surface and a having an edge facing and recessed from the media-facing surface. A write pole extends beyond the first end of the yoke towards the media-facing surface and overlaps a first surface of the yoke that faces the near-field transducer. The write pole has a stepped edge facing away from the media-facing surface. Two or more coil turns are stacked relative to one another in a down-track direction. The two or more coils face a second surface of the yoke that is opposed to the first surface.

20 Claims, 10 Drawing Sheets

(56) References Cited

U.S. PATENT DOCUMENTS

| | | | |
|---|---|---|---|
| 2014/0269819 A1* | 9/2014 | Kiely | G11B 5/3116 374/45 |
| 2014/0285919 A1* | 9/2014 | Tanaka | G11B 5/314 360/59 |
| 2014/0313613 A1* | 10/2014 | Lee | G11B 5/17 360/99.08 |
| 2015/0179204 A1* | 6/2015 | Mosendz | G11B 5/7325 369/13.33 |
| 2015/0255096 A1* | 9/2015 | Sasaki | G11B 5/4866 369/13.33 |
| 2015/0262593 A1* | 9/2015 | Sasaki | G11B 5/314 369/13.17 |
| 2016/0064020 A1* | 3/2016 | Ikai | G11B 5/483 369/13.13 |
| 2016/0115612 A1* | 4/2016 | Ikegawa | G11B 5/3123 205/122 |
| 2016/0125898 A1* | 5/2016 | Ren | G11B 5/314 369/13.33 |
| 2016/0217816 A1* | 7/2016 | Sayama | G11B 5/65 |
| 2016/0225390 A1* | 8/2016 | Saito | G11B 5/3123 |
| 2016/0343391 A1* | 11/2016 | Sasaki | G11B 5/315 |
| 2016/0372140 A1* | 12/2016 | Bian | G11B 5/314 |

\* cited by examiner

MAGNETIC WRITE TRANSDUCER WITH FLAT POLE SECTION

RELATED PATENT DOCUMENTS

This application claims the benefit of Provisional Patent Application No. 62/340,365 filed on May 23, 2016, which is incorporated herein by reference in its entirety.

SUMMARY

A recording head includes a magnetic write transducer proximate a near-field transducer. The magnetic write transduce includes a yoke extending in a direction normal to a media-facing surface and a having an edge facing and recessed from the media-facing surface. A write pole extends beyond the first end of the yoke towards the media-facing surface and overlaps a first surface of the yoke that faces the near-field transducer. The write pole has a stepped edge facing away from the media-facing surface. Two or more coil turns are stacked relative to one another in a down-track direction. The two or more coils face a second surface of the yoke that is opposed to the first surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. Drawings are not necessarily to scale.

DETAILED DESCRIPTION

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into a hotspot in a recording layer. The hotspot raises the media temperature locally, reducing the writing magnetic field required for high-density recording. A waveguide integrated into a read/write head delivers light to the near-field transducer and excites the near-field transducer. In response, the near-field transducer achieves surface plasmon resonance and tunnels a stream of surface plasmons to heat the recording medium. A magnetic transducer, which includes a magnetic write pole, applies a magnetic field to the hotspot, locally changing magnetic orientation within the hotspot, while regions outside the hotspot are not affected by the applied field.

Some HAMR writers may be constructed to fit the existing optical system, with less priority given to the magnetic performance. In some designs for example, a large portion of the writer pole close to the air-bearing surface (ABS) may be tilted. This can result in the recording field being diminished. This loss of field can be mitigated by reshaping the pole tip, but this may not completely compatible with some manufacturing processes.

Other effects of tilting the writer pole include suboptimal rise time and/or saturation currents, and difficulties in efficiently closing the magnetic flux. In an example of the latter, bringing the trailing shield close to the pole tip may result in the trailing-shield-to-write-pole close point being positioned away from the ABS, taking away flux from the pole tip. In the disclosure below, a magnetic transducer is described that can increase magnetic field strength. The magnetic transducer may be designed to work together with a particular near-field transducer to enable high areal data density and high data-rate recording.

Figure 1:
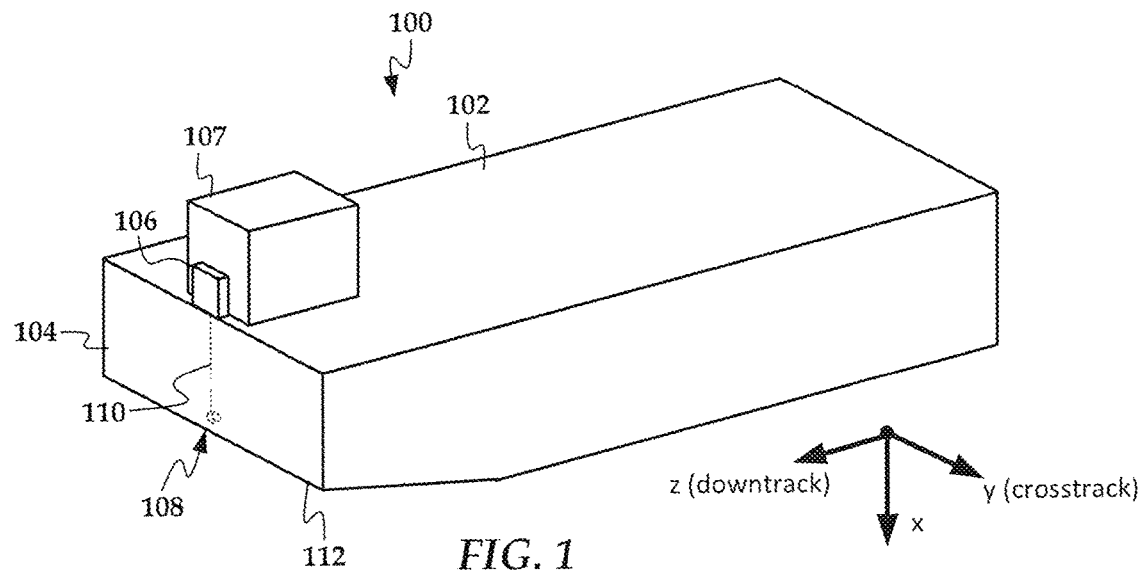
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode 106 mounted on submount 107) and a waveguide core 110. The waveguide core 110 delivers electromagnetic energy from the energy source 106 to a near-field transducer that is part of the read/write transducers 108. The near-field transducer achieves surface plasmon resonance in response and directs the energy out of a media-facing surface 112 (also referred to as an air-bearing surface) to create a small hot spot on the recording medium.

Figure 2:
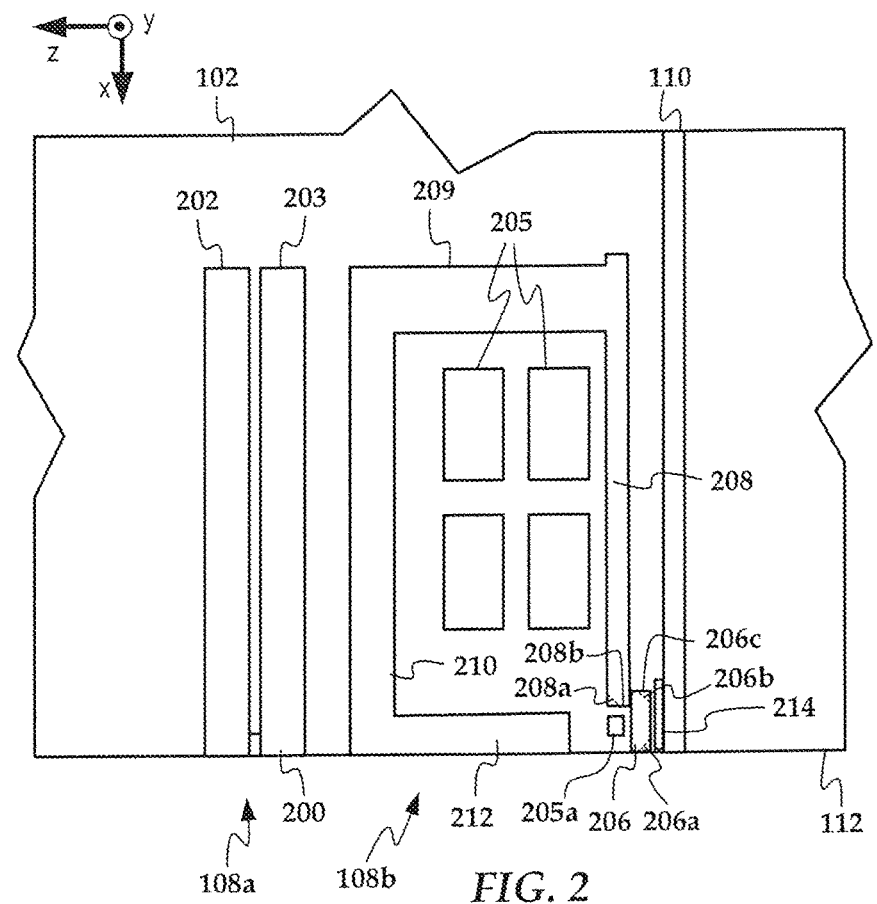
FIG. 2 is a cross-sectional view of read and write transducers according to example embodiments.

In FIG. 2, a cross-sectional view of a slider shows details of the read/write transducers 108 according to an example embodiment. A read transducer 108a includes a read element 200 (e.g., magnetoresistive stack) located between shields 202-203. A magnetic write transducer 108b includes a coil 205 that, when energized, induces magnetic flux through a write pole 206, yoke 208, via 209, return pole 210 and shield 212. A near-field transducer (NFT) 214 is located at the media-facing surface 112 proximate the write pole 206. Light propagating through the waveguide causes the NFT 214 to achieve surface plasmon resonance.

As seen in the figure, the pole 206 is flat (e.g., formed as a layer on the substrate-parallel, xy-plane) and can have a thickness (z-direction dimension) between 100-300 nm. The size of the pole 206 may be smaller in the x-direction (e.g., normal to the media-facing surface 112) than the corresponding size of the NFT 214 in the x-direction. To keep the pole structure away from the NFT edges, and limit the optical loss, the pole 206 is positioned behind the NFT 214. A part of the magnetic pole 206 closely proximate or in contact with the NFT 214 may be partially conformal to the NFT 214, e.g., having the same surface contours over at least part of the facing sides of the NFT 214 and pole 206. Bottom and top bevels may optionally be added to the pole 206, as indicated by dashed lines 206a-b. The pole 206 may be wrapped with a metallic/thermal conductor layer to limit optical absorption and improve thermal heatsinking.

A compact waveguide core 110 is located near the flat pole 206. The core 110 is somewhat recessed from the pole 206 in the downtrack direction (z-direction) in order to maintain optical performance. As illustrated, the pole 206 is stacked on the yoke 208, such that an edge 208b of the yoke 208 facing the media-facing surface 112 is rectangular and a stepped edge 206c of the pole 206 faces away from the media-facing surface 112. The edges 208b, 206c may be sloped, e.g., via optional bevel 206b on the pole and/or a corresponding optional bevel 208a on the core 208. Generally, the bevels 206a, 206b, and 208a are at an acute angle (between 0 and 90 degrees) relative to the media-facing surface 112.

The turns of the coil 205 are stacked, e.g., overlapping on a plane parallel to the substrate on which the head is formed, referred to herein as a substrate-parallel plane. In this example, the substrate-parallel plane is the xy-plane. The coil 205 may include two to six turns between the yoke 208 and return pole 210. Stacking the turns of the coil 205 allows to making the structure compact with respect to the distance from the media-facing surface 112. In one embodiment, a coil turn 205a may be located in proximity to the flat pole 206, between the edge 208b of the yoke 208 and the media-facing surface 112. Besides improving the efficiency and rise time of the structure, the direct field of the coil turn 205a adds to the field in the recording layer.

Figure 3:
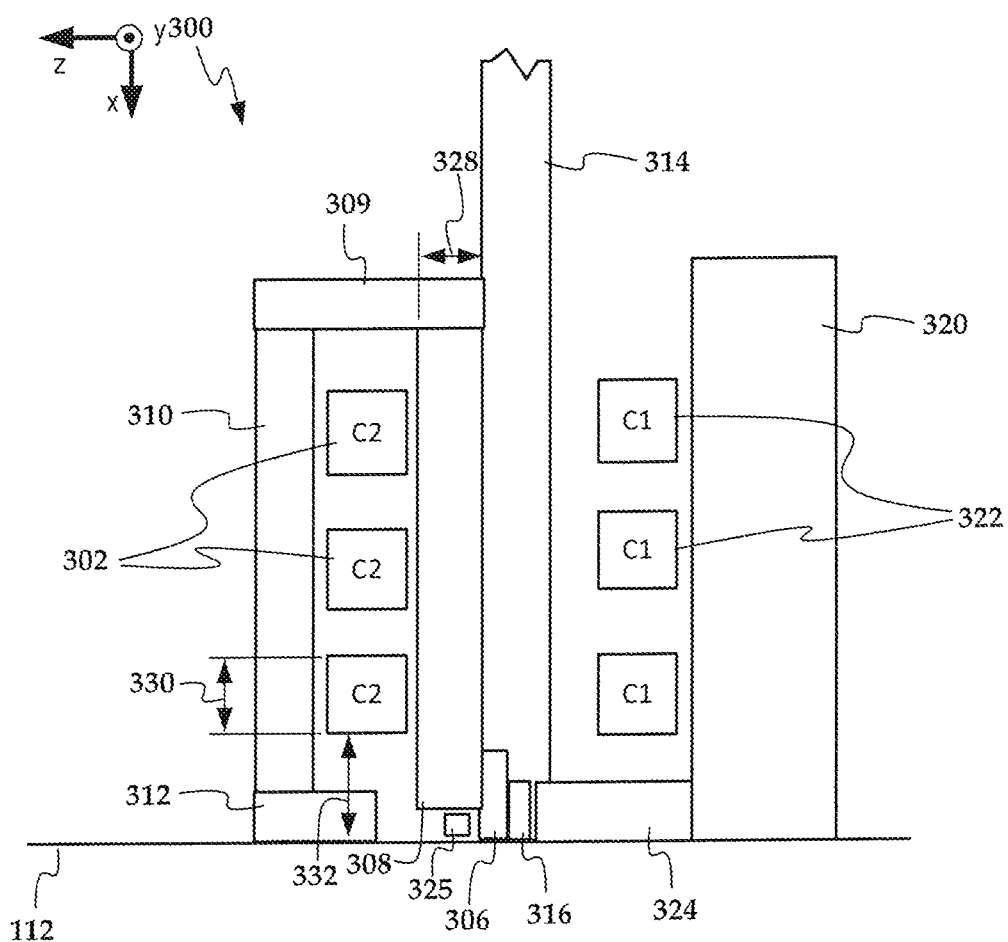
FIG. 3 is a cross-sectional view of a magnetic write transducer according to another example embodiment.

In FIG. 3, a cross-sectional view shows details of a magnetic write transducer 300 according to another example embodiment. The magnetic write transducer 300 includes a coil 302 (C2) that, when energized, induces magnetic flux through a write pole 306, yoke 308, via 309, first return pole 310 (RP2) and shield 312. A near-field transducer (NFT) 214 is located at a media-facing surface 112 proximate the write pole 306. Light propagating through a waveguide 314 causes an NFT 316 to achieve surface plasmon resonance, heating a recording medium when the field is applied. Another return pole 320 is located on an opposite side of the NFT 316. Another coil 322 (C1) is located near the return pole 320, and a leading shield 324 extends from the return pole 320 to the NFT 316. The coils C1 and C2 are driven to cancel the mutual inductance. The coils C1 and C2 can be driven separately, or can be tied together electrically. In some embodiments, there may be a flux path (e.g., by a via formed of ferrous material) between the second pole 320 and the yoke 308 and other structures. In other cases, there may be no flux path between the second pole 320 and yoke 308.

The pole 306 is flat and can have a thickness and other features (e.g., bevels, thermal layer) similar to pole 206 described in relation to FIG. 2. The coils 302, 322 may be stacked and have different numbers of turns than shown. Other features shown in FIG. 2 may also be used with this embodiment, e.g., coil turn 325 near pole 306 between an edge of the yoke 308 and the media-facing surface 112.

Figure 4:
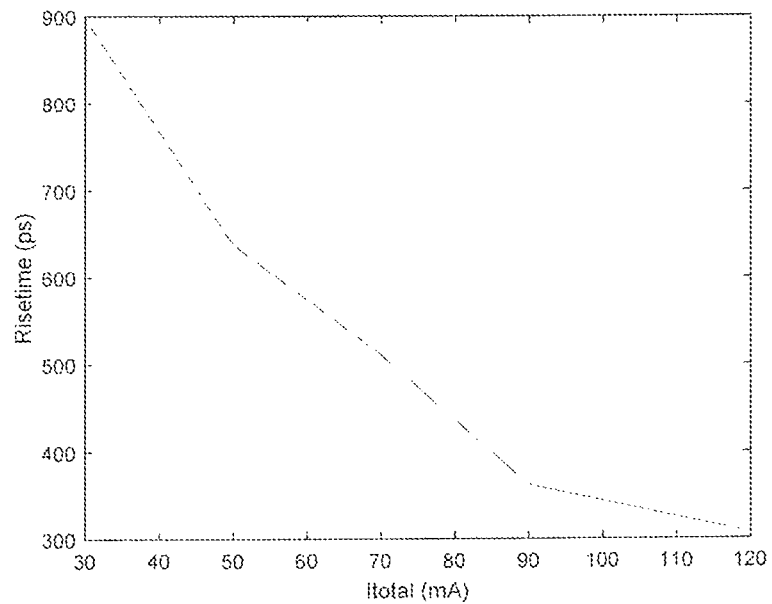
FIGS. 4, 5, 6, 7, 8 and 9 are graphs of rise time for various dimensions of a write transducer according to example embodiments.

Modeling this configuration gives risetime versus current results shown in FIG. 4, with trailing-edge width in the cross-track direction (TPWT) of 150 nm. Effective field is in excess of 26 KOe maximum, or 23 KOe averaged over the track. Saturation knee is at 50 mA. Overshoot current amplitude (OSA) is likely around 30-40 mA with steady state around 50-60 mA Risetime of 310-360 ps appears to be within acceptable range of OSA. However results do not saturate at 120 mA, and higher OSA can yield sub 300 ps rise times.

Figure 5:
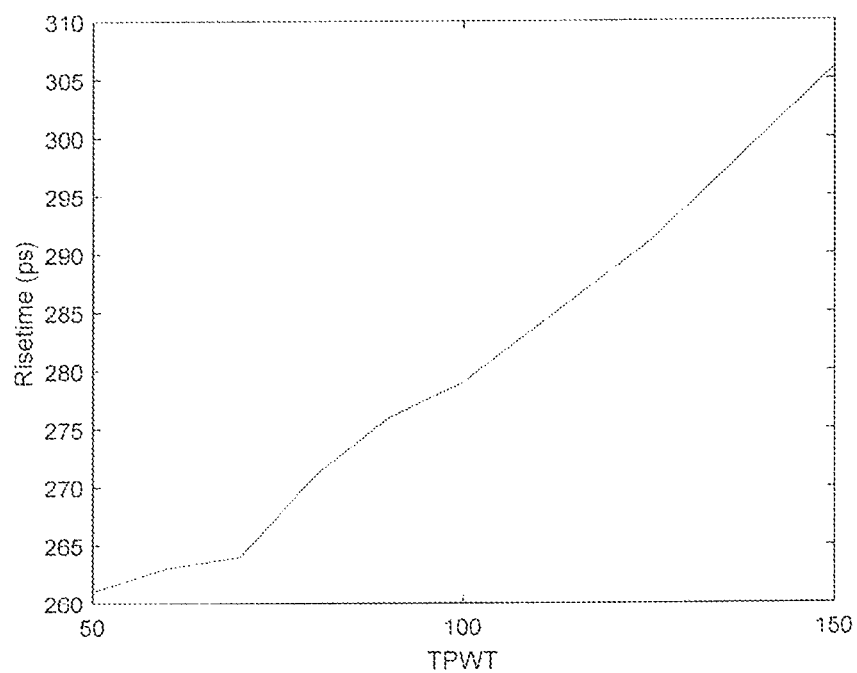

The graph in FIG. 5 shows sensitivity of TPWT at 120 mA. The results are somewhat consistent with overall trend with 1 nm TPWT and top pole length (TPL, measured in the downtrack, z-direction) reduction per 1 ps risetime (RT) reduction. However the results can be also interpreted in terms of OSA gain.

Table 1 below shows relationships for current and field. Peak write field is reported. For track averages, the media area is scanned and the track with the highest averaged field value is reported.

TABLE 1

| TPWT | 50 nm | 70 nm | 150 nm |
| --- | --- | --- | --- |
| Current to maintain 270 ps rise time | 114 mA | 119 mA | 137 mA |
| Saturation knee | 37 mA | 43 mA | 52 mA |
| Write field for 400 KTPI, static | 16 KOe | 20 KOe | 23 KOe |
| Write field for 700 KTPI, static | 19 KOe | 22 KOe | 25 KOe |
| Write field for 400 KTPI, at 3 GBPs/120 mA | 14 KOe | 17 KOe | 18 KOe |
| Write field for 700 KTPI, at 3 GBPs/120 mA | 16 KOe | 20 KOe | 21 KOe |

Other modeling has found field loss strongly correlates with 80-80 risetime and somewhat more so with 90-90 risetime. However, is the risetime change is due to design changes of different nature (coil recess vs. TPWT, for example), then correlation is reduced. Risetime jitter is overall well correlated with risetime for the same design class. Risetime evaluation is >10-20 times faster than direct impact of data rate (DR) on field. The latter involves at least 3-5 bits (3 transitional and 2-3 measurable) to see the constant DR performance.

Simple analytical expression would predict field loss proportional to truncation of exponential time dependence with a given constant risetime. However, due to decreased saturation the physical risetime of the writer improves at high DR. This means that the higher DR loss will be smaller than expected, or alternatively—high RT loss will be smaller than predicted.

From this it can be concluded that overall achievable risetime is in 270-330 ps range. Moving to sub-300 ps risetime can be enabled by design changes (discussed below), by very high OSA or pole width optimization. From 150 to 100 nm TPWT there is some improvement of risetime and saturation at expense of static field. At 3-4 Gbps the field of 80-100 nm write pole might show even very slight improvement over 150 nm. A 50 nm write pole produces field which is very non-uniform in cross-track direction, with much higher curvature. At high track density (e.g., 700+ KTPI) and high data rate (e.g., 4+ GBPs) a 50 nm write pole may hold some advantages, but it appears that at more relaxed conditions it is less optimal than 70-80 nm poles.

Performance modeling (with media) was inconclusive between 80-100 nm poles, with some penalty at 50 nm TPWT, and some high DR penalty for 150 nm TPWT. The shift is not exactly the same for RT increases of different nature (TPWT vs. coil recess), however in the zeroth order approximation can be accounted by a phenomenological "speedup" of the writer at high DR.

In reference again to FIG. 3, dimensions that were analyzed in the present design include yoke thickness 328, coil dimensions 330, and coil recess 332. Changes in yoke thickness 328 also moves coils C2, but not return pole 310. Coil dimensions 330 keep recesses constant. All runs are with 150 nm TPWT and 120 mA current. The graphs in FIGS. 6-16 show modeling results of this design using various design parameters. Limited runs with "all-optimum" parameters show that for such relatively large risetimes, the effects are quite stackable.

Figure 6:
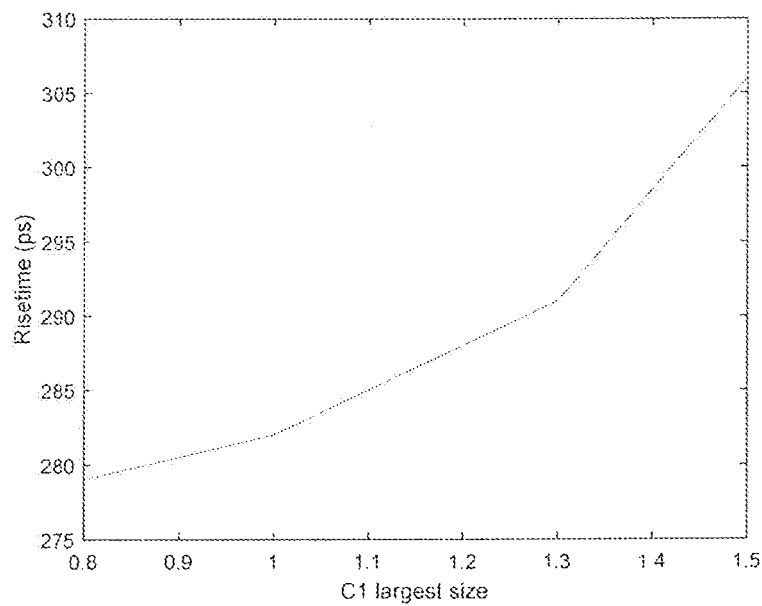
Figure 7:
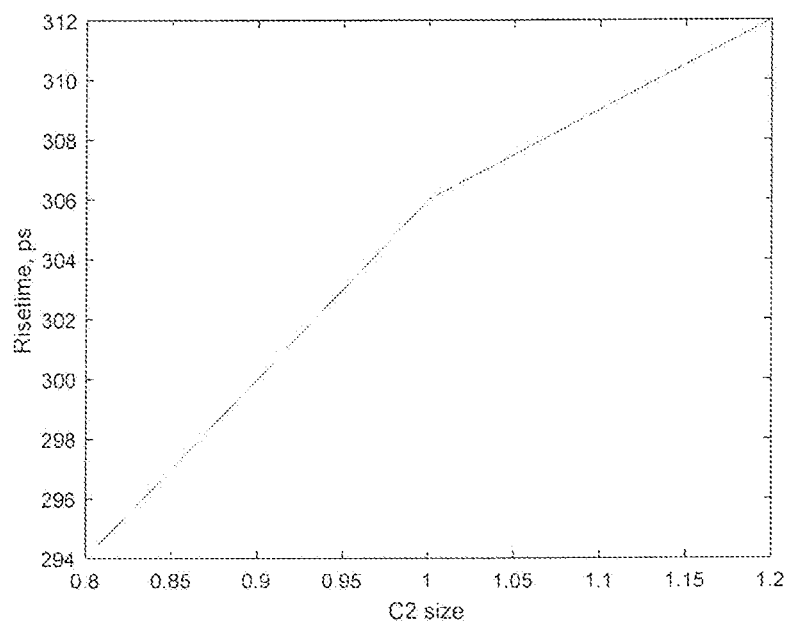
Figure 8:
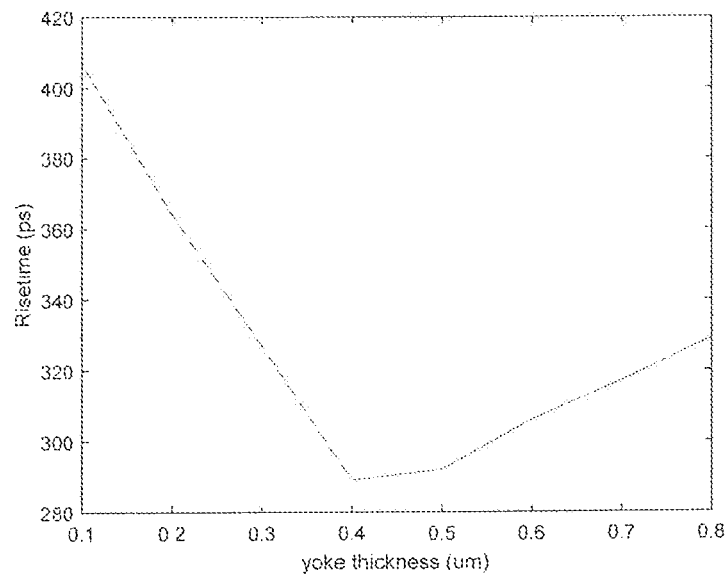
Figure 9:
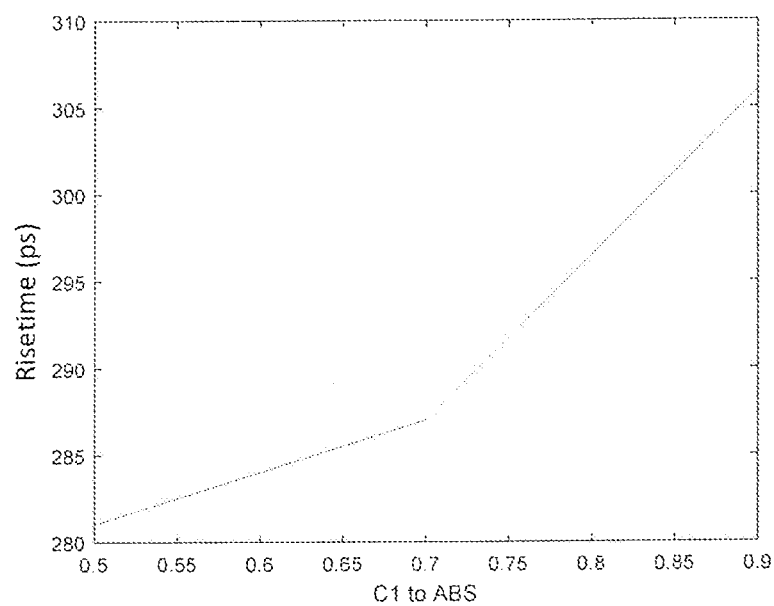
Figure 10:
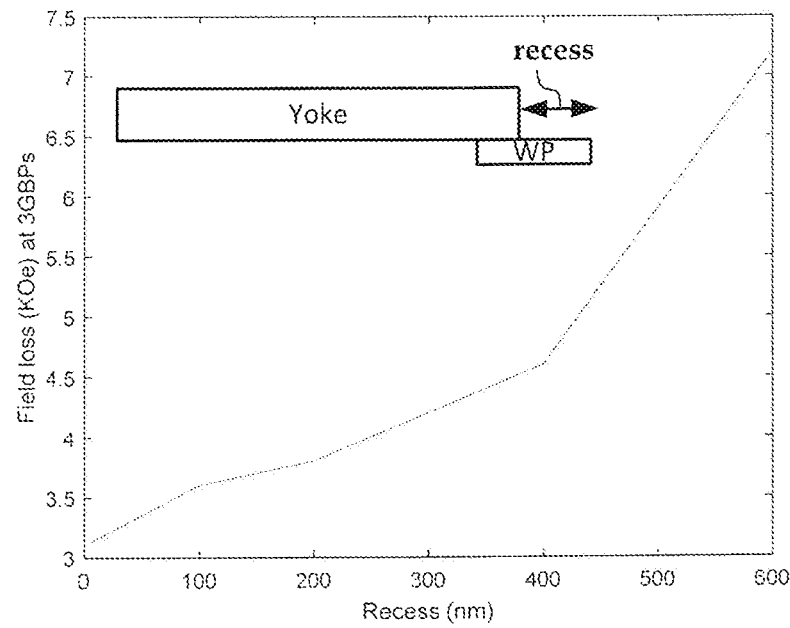
FIG. 10 is a graph of magnetic field for a write transducer according to an example embodiment.
Figure 11:
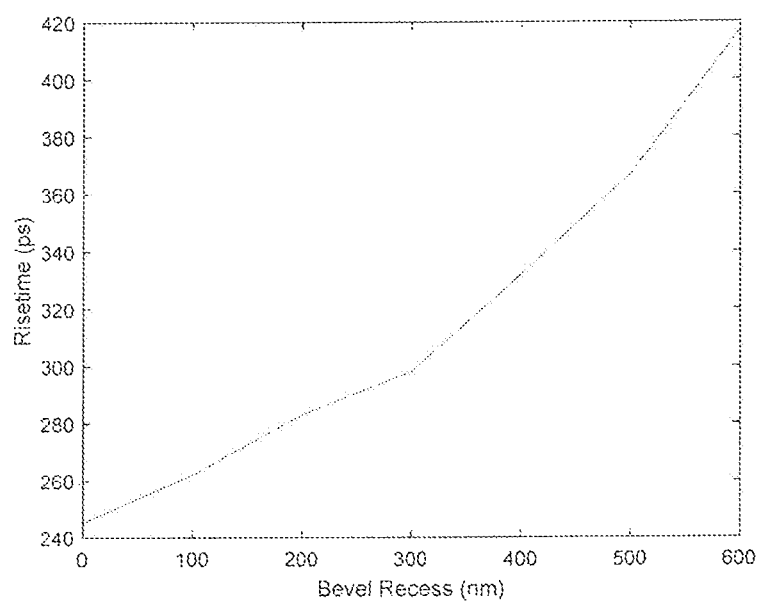
FIGS. 11 and 12 are graphs of rise time for various dimensions of a write transducer according to example embodiments.

Regarding FIG. 6, 1.5 um is what is taken as the baseline for C1 (1.2 um×1.5 um). There is substantial improvement for 1 um coils. As seen in FIG. 8, too thick a yoke 308 channels flux into return pole 310 and moves the coils C2 away, and too thin a yoke 308 does not conduct flux. A sloped yoke may provide an optimal balance. FIG. 9 shows coil C1 recess to the media-facing surface. FIGS. 9 and 10 show impact of bevel recess R on magnetic field and risetime.

Figure 12:
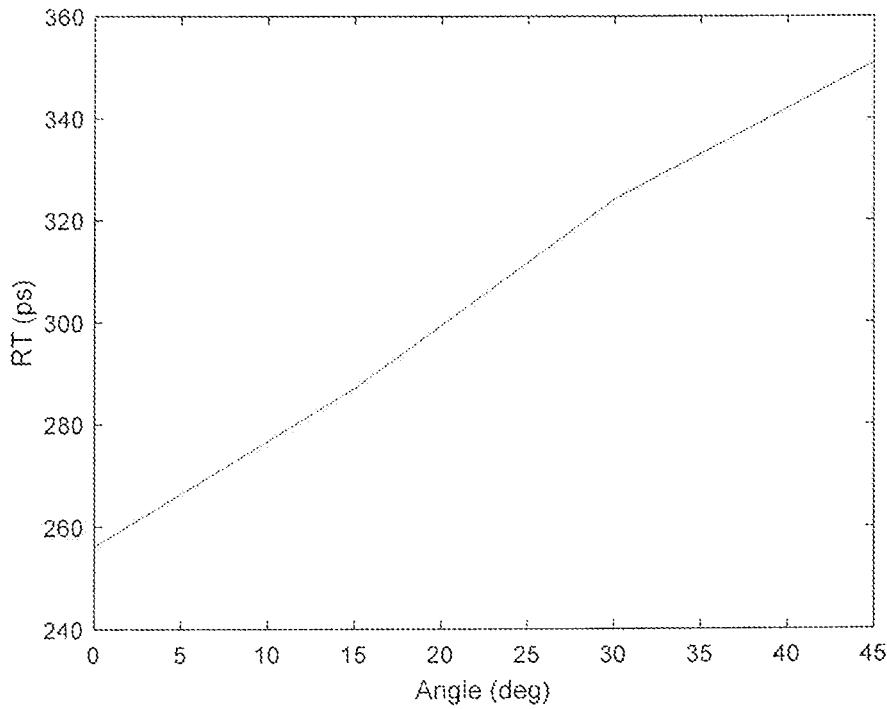
Figure 13:
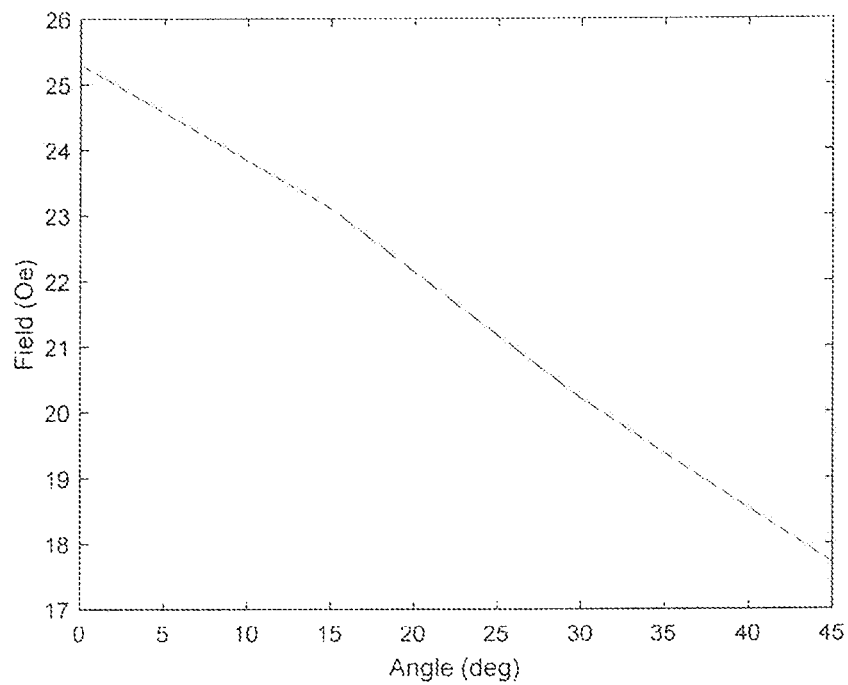
FIGS. 13 and 14 are a graphs of magnetic field for a write transducer according to example embodiments.
Figure 14:
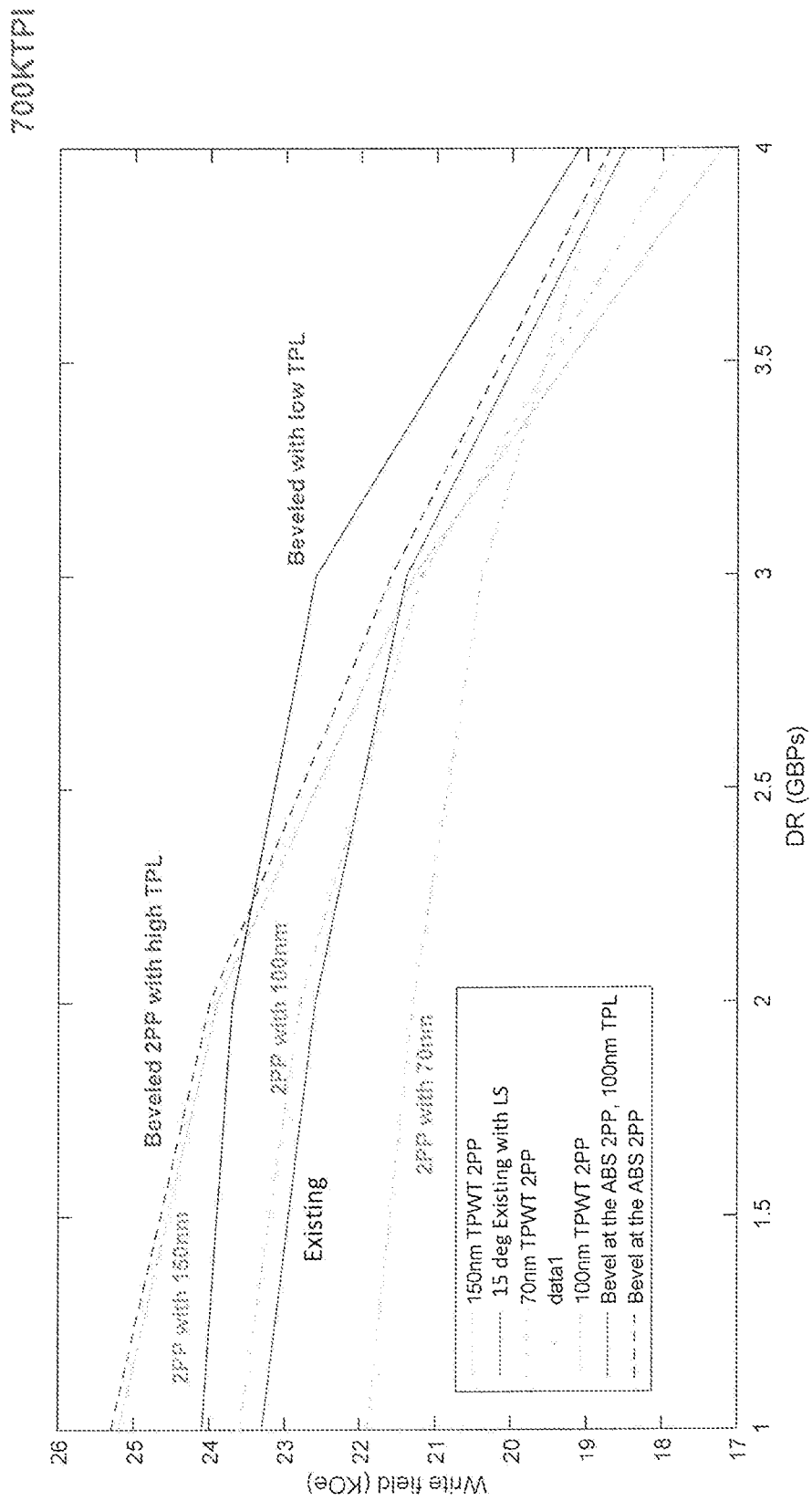

Graphs in FIGS. 12 and 13 show the effects of pole angle on field and RT for this design. The lack of field angle control can limit the amount of Stoner Wohlfarth effective field produced even at low write pole inclination, especially without the soft underlayer (SUL). Good risetime can be observed at low inclination. It can be further reduced by decreasing TPWT. However, much of good risetime comes from using 6 turn coil. If a "standard" stacked pole only starts to saturate with risetime at 120 mA, older designs are well saturated dynamically by then. More than three turns may be needed; e.g., four full turns for stacked pole design.

In summary, a beveled, stacked pole with bevel at the ABS and reduced TPL sacrifices very little field but is the fastest of the designs with the largest field. A beveled stacked pole design strongly benefits from the TPL reduction to about 100 nm.

Figure 15:
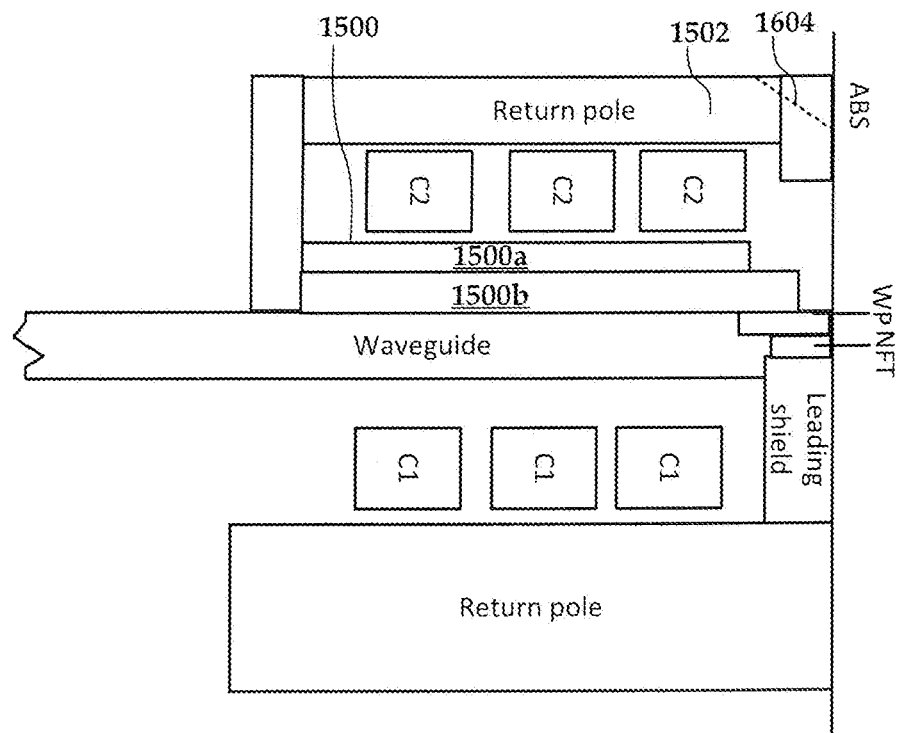
FIGS. 15, 16, 17, and 18 are cross-sectional views of write transducers according to additional embodiments.

In FIG. 15, a cross-sectional view shows a write pole design with a stacked yoke 1500. A first section 1500a (also referred to as the "trailing part") faces the coil turns C2. A second section 1500b (also referred to as the "leading part") is stacked on the first section and faces away from the coils C2. The first section 1500a is further recessed from the media-facing surface (ABS) than the second section 1500b. A beveled return pole 1502 (as indicated by dashed line 1604) or stacked yoke 1500 will increase flux and decrease leakage. For the stacked yoke 1500, the best result is expected by reducing the thickness of the leading part 1500b to 400-500 nm and making trailing part 1500a of 200-400 nm thickness, aligned with the coils. A similar stacked yoke can be used in a configuration without a leading coil or shield, e.g., the configuration shown in FIG. 2 may use a stacked yoke.

Figure 16:
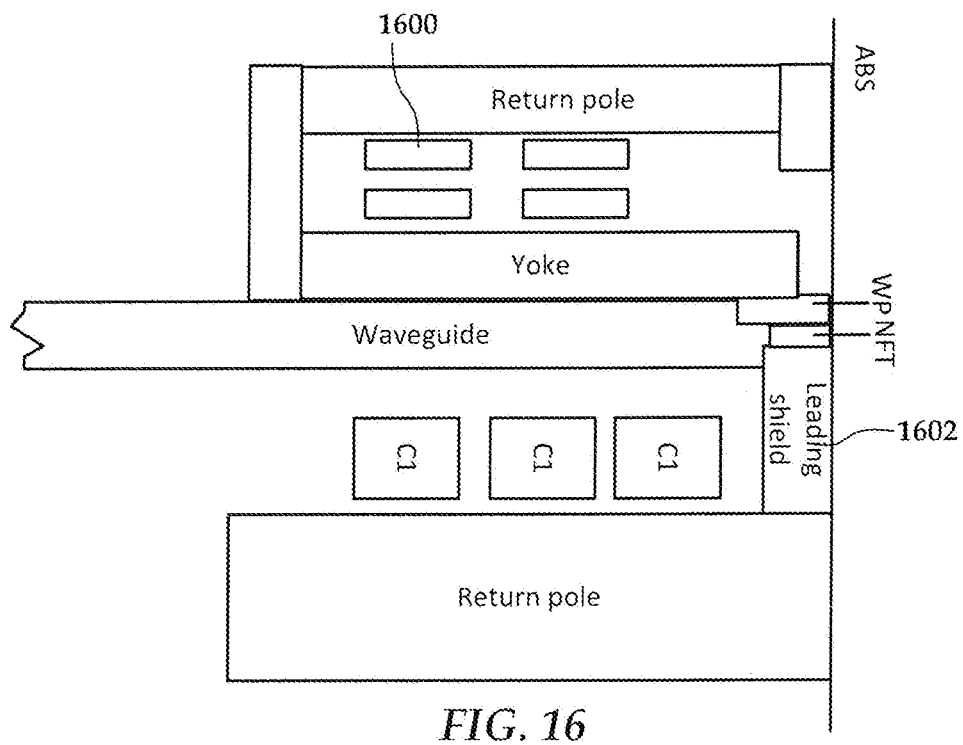

In FIG. 16, a cross-sectional view shows a write pole design with stacked coil 1600. This can reduce the knee of RT from 115-140 mA (depending on TPWT) to about 90-100 mA. Placing four coil turns in line without stacking does not have comparable effect. Static saturation current is reduced almost proportionally by about 15%. On the leading shield 1602, an extra coil (not shown) can be added to coil C1 making this four-turns in a line. In such a case beveling the yoke is somewhat beneficial, as is shown in FIGS. 17 and 18.

Figure 17:
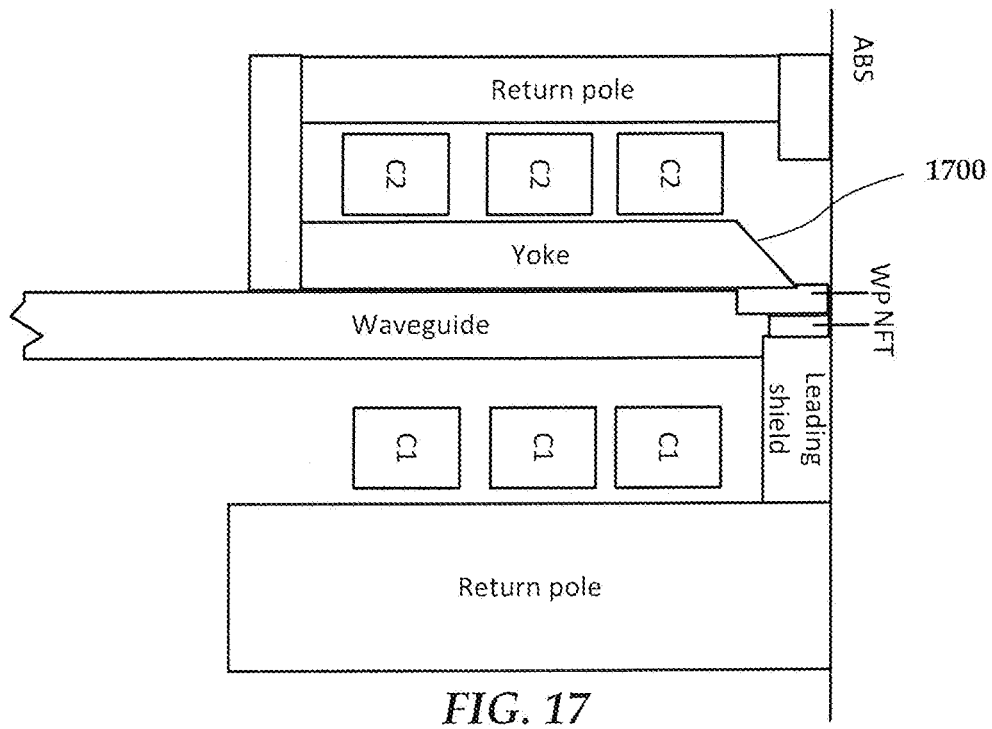
Figure 18:
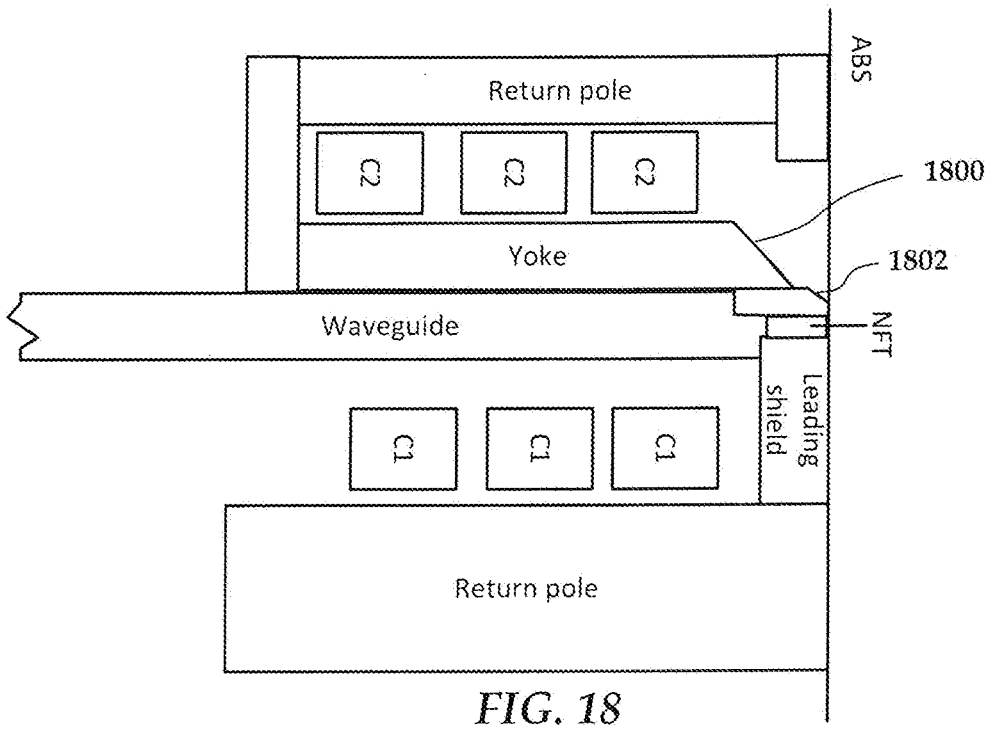

In FIG. 17, a cross-sectional view shows a write pole design with a bevel 1700 on the yoke. In FIG. 18, a cross-sectional view shows a write pole design with a bevel 1800 on the yoke and a bevel 1802 on the write pole (WP). Generally, the bevels 1700, 1800, and 1802 are at an acute angle relative to the media-facing surface (ABS). Similar beveled yokes and or poles may be used in a configuration without a leading coil or shield, e.g., the configuration shown in FIG. 2 may use a beveled yoke and/or write pole. Similarly, the embodiments in FIGS. 15-17 may include features shown in FIGS.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head, comprising:
   a waveguide core configured to deliver energy to a near-field transducer at a media-facing surface of the recording head; and
   a magnetic write transducer proximate the waveguide core, the magnetic write transducer comprising:
   a yoke extending in a direction normal to the media-facing surface and a having an edge facing and recessed from the media-facing surface;
   a write pole extending beyond the edge of the yoke towards the media-facing surface in the direction normal to the media-facing surface and overlapping part of a first surface of the yoke that faces the waveguide core, the write pole comprising a flat edge facing away from the media-facing surface, the flat edge forming a step with the first surface of the yoke;
   two or more coil turns stacked relative to one another in a down-track direction, the two or more coils facing a second surface of the yoke that is opposed to the first surface; and
   at least one coil turn proximate the write pole, the at least one coil turn located between the edge of the yoke and the media-facing surface.

2. The recording head of claim 1, wherein the write pole is smaller than the near-field transducer in the direction normal to the media-facing surface.

3. The recording head of claim 1, wherein the two or more coil turns comprise a first set of two or more turns stacked on a second set of two or more turns.

4. The recording head of claim 1, wherein the yoke comprises a first section facing the two or more coil turns and a second section stacked on the first section and facing away from the two or more coil turns, the first section being further recessed from the media-facing surface than the second section.

5. The recording head of claim 1, wherein the edge of the yoke is beveled at an acute angle relative to the media-facing surface.

6. The recording head of claim 1, wherein a second edge of the write pole opposed to the flat edge is beveled at an acute angle relative to the media-facing surface.

7. The recording head of claim 1, further comprising:
a return pole facing a side of the waveguide core that faces away from the near-field transducer; and
a second coil between the second return pole and the near-field transducer.

8. A recording head, comprising:
a near-field transducer at a media-facing surface of the recording head and configured to receive optical energy from a waveguide core; and
a magnetic write transducer proximate the near-field transducer, the magnetic write transducer comprising:
a yoke extending in a direction normal to the media-facing surface and a having an edge facing and recessed from the media-facing surface;
a write pole extending beyond the first end of the yoke towards the media-facing surface in the direction normal to the media-facing surface and overlapping a first surface of the yoke that faces the near-field transducer, the write pole comprising a flat edge facing away from the media-facing surface;
a first return pole downtrack from the yoke;
a first coil between the first return pole and the write pole;
a second return pole facing a side of the waveguide core that faces away from the near-field transducer; and
a second coil between the second return pole and the near-field transducer.

9. The recording head of claim 8, wherein the magnetic write transducer further comprises at least one coil turn proximate the write pole, the at least one coil turn located between the edge of the yoke and the media-facing surface.

10. The recording head of claim 8, wherein a part of the write pole closely proximate to or in contact with the near-field transducer is partially conformal to the near-field transducer.

11. The recording head of claim 8, wherein the two or more coil turns comprise a first set of two or more turns stacked on a second set of two or more turns.

12. The recording head of claim 8, wherein the yoke comprises a first section facing the two or more coil turns and a second section stacked on the first section and facing away from the two or more coil turns, the first section being further recessed from the media-facing surface than the second section.

13. The recording head of claim 8, wherein the edge of the yoke is beveled at an acute angle relative to the media-facing surface.

14. The recording head of claim 8, wherein a second edge of the write pole opposed to the flat edge is beveled at an acute angle relative to the media-facing surface.

15. The recording head of claim 8, wherein the first and second coils are separately driven to cancel a mutual inductance.

16. A recording head comprising:
a near-field transducer at a media-facing surface of the recording head and configured to receive optical energy from a waveguide; and
a magnetic write transducer proximate the near-field transducer, the magnetic write transducer comprising:
a yoke extending in a direction normal to the media-facing surface and a having an edge facing and recessed from the media-facing surface;
a write pole extending beyond the first end of the yoke towards the media-facing surface in the direction normal to the media-facing surface and overlapping a first surface of the yoke that faces the near-field transducer, the write pole comprising a flat edge facing away from the media-facing surface;
two or more coil turns facing a second surface of the yoke that is opposed to the first surface; and
at least one coil turn between the edge of the yoke and the media-facing surface.

17. The recording head of claim 16, wherein a part of the write pole closely proximate to or in contact with the near-field transducer is partially conformal to the near-field transducer.

18. The recording head of claim 16, wherein the two or more coil turns comprise a first set of two or more turns stacked on a second set of two or more turns.

19. The recording head of claim 16, wherein the yoke comprises a first section facing the two or more coil turns and a second section stacked on the first section and facing away from the two or more coil turns, the first section being further recessed from the media-facing surface than the second section.

20. The recording head of claim 16, wherein the edge of the yoke is beveled at an acute angle relative to the media-facing surface.

* * * * *